April 1, 1969 J. L. TICKLE 3,435,600
APPARATUS FOR TRIMMING OR CUTTING VINES OR OTHER VEGETATION
Filed Dec. 22, 1965
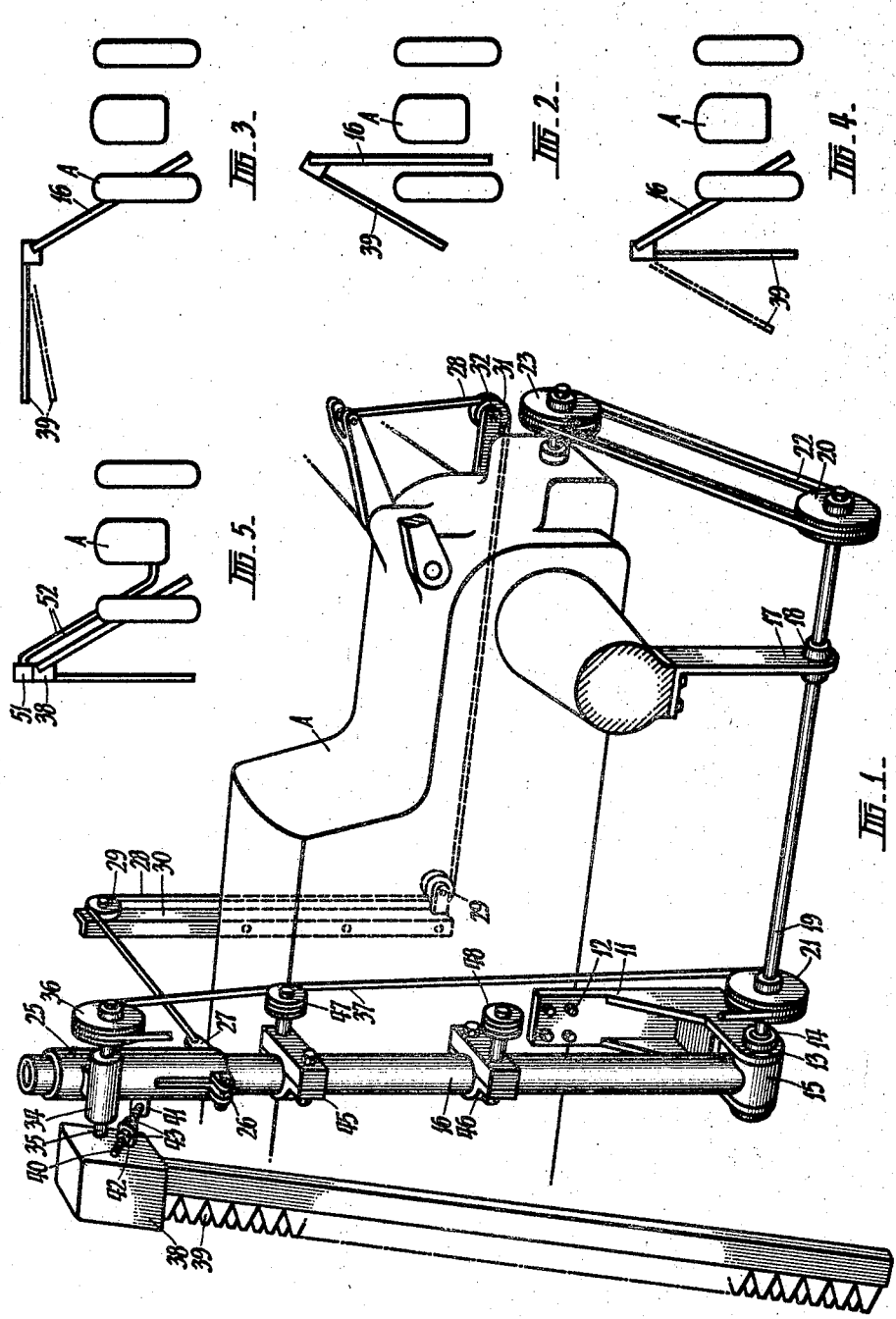

United States Patent Office 3,435,600
Patented Apr. 1, 1969

3,435,600
APPARATUS FOR TRIMMING OR CUTTING VINES OR OTHER VEGETATION
John Leslie Tickle, Hartwell, near Melbourne, Victoria, Australia, assignor of one-half to Peter Bruce Arnold, Cobdogla, South Australia, Australia
Filed Dec. 22, 1965, Ser. No. 515,561
Claims priority, application Australia, Dec. 23, 1964, 53,291/64
Int. Cl. A01d 55/02
U.S. Cl. 56—237                6 Claims

ABSTRACT OF THE DISCLOSURE

Apparatus, which may be tractor mounted, for cutting vines and other vegetation, particularly between rows and at diverse angles, which comprises an adjustable column, bracket means connected pivotally to one end of the column, the bracket means being adapted to be mounted on a tractor in such manner as to support the column in upwardly-extending position and being pivotal relative to the tractor, a cutter bar, a driving head at one end of the cutter bar, driving means for imparting a drive to cutter blades supported by the cutter bar, support means at the upper end of the column supporting the driving head and cutter bar in adjustable angular relationship with the column, means for adjusting the angular position of the cutter bar relative to the column and for securing them in adjusted angular relationship, and power means for imparting a drive to the driving means.

---

This invention relates to apparatus for trimming or cutting vines or other vegetation, and it relates particularly to apparatus for mounting on a tractor so as to be capable of being driven thereby and usable for cutting excess or unwanted growth from vegetation such as grape vines.

Grape vines are planted so as to grow in rows and as they grow they are supported by wires extending the lengths of the rows. In certain areas, particularly irrigation areas, the growth of foliage is sometimes rather excessive such that the foliage requires to be trimmed back. It is sometimes necessary to trim the lower part of the foliage so as to clear away the foliage around the lower parts of the vines. Also, it may be necessary to cut the foliage vertically along the face of the vine, so as to provide sufficient space between adjoining rows. Further, it may be desirable to trim off the tops of the vines.

Naturally, the work to be done may vary from row to row, and conditions will change according to seasonal and climatic conditions.

Generally, there is very little room between adjacent rows of vines and if a tractor has equipment projecting sideways beyond the wheels it will not be conveniently possible to drive the tractor between the adjacent rows. Therefore, in order to provide apparatus usable for trimming grape vines it is necessary that the apparatus be mounted on the tractor so that it does not project sideways beyond the tractor wheels.

For trimming grape vines, particularly in irrigation districts, it is necessary to cut the foliage along the bottom part of the vine to enable the free flow of air above the ground surface and below the main growth of the vine. Thus, the apparatus must be capable of being used to cut underneath the main growth of the vine, as well as being usable to cut along the top of the vine.

These several requirements—

(1) That the apparatus should not project sideways beyond the rear wheels of a tractor, to enable the tractor with the vine-cutting apparatus attached to be driven between adjacent rows of the vines;

(2) That the apparatus should be usable to cut along the tops of the vines;

(3) That the apparatus should be usable to cut the foliage along the bottom of the vine and close into the stem or stalk of the vine so as to provide sufficient airspace between the ground and below the main growth of the vine;

(4) That the apparatus should be capable of ready adjustment to suit the vines of different rows and make it ready to perform the different trimming or cutting operations;

(5) That the apparatus should be of simple nature, easy to operate and economical to make are, to an extent, somewhat contradictory.

It is an object of this invention to provide apparatus attachable to a tractor which may be operated in an easy manner to trim or cut away excess foliage of vines and/or other vegetation. Another object is to provide apparatus which may be readily adjusted to suit the different requirements of different rows of vines and which may be readily adapted to perform all such trimming or cutting operations as may be required. A further object is to provide apparatus of relatively simple character which may be readily set or adjusted, and operated, to perform all the trimming operations to maintain vines in good condition, to enable the vines to be properly cultivated, to be spur pruned and make them ready to be harvested.

The invention provides a column supporting a cutter bar at its upper end and having at its lower end means for mounting it upon a tractor in such manner that the column will extend upwardly from such mounting means and the driving head of the cutter bar is supported by the upper end portion of the column, means for adjusting the angular relationship of the column relative to the tractor whereon it is mounted, means for adjusting the angular relationship of the cutter bar and the column and means for imparting a drive from the tractor to the cutter bar.

In order that the invention may be readily understood and conveniently put into practical effect we shall now describe, with reference to the accompanying illustrative drawings, one exemplary construction of apparatus made according to the invention. In these drawings:

FIG. 1 is a perspective view showing the apparatus mounted on, and connected to the operating mechanism of a tractor; and FIGS. 2, 3 and 4 are diagrammatic illustrations showing different positions in which the apparatus may be set for operation.

FIG. 5 is a diagrammatic view of a modification.

A bracket 11 is fastened to the near-side of the body of a tractor A by bolts 12 and said bracket has two substantially parallel arms 13 having a sleeve 14 mounted near their outer ends, said sleeve 14 rotatably supporting a collar 15 fastened at one end of a column 16 so that the column can pivot in a vertical plane about the sleeve 14. A second bracket 17 is fastened to an axle housing of the tractor and said bracket has self-aligning bearing 18 near its lower end. A longitudinal shaft 19 is mounted rotatably in that bearing 18 and in a bearing housed within the sleeve 14, and on the shaft 19 are fastened two pulley wheels 20 and 21, the pulley wheel 20 being adapted to be driven by a belt 22 from a pulley wheel 23 on the tractor power take-off shaft.

Slidably mounted on the column 16, near its upper end is a sleeve 25 having clamping means 26 to enable the sleeve to be secured in selected adjusted position. The sleeve 25 also has, near its lower end, a lug 27 for the attachment of one end of a cable 28 which extends about two pulley wheels 29 mounted rotatably on a support 30 fastened to the off-side of the tractor and about a pulley wheel 31 mounted on a bracket 32 at the rear of the tractor, the opposite end of the cable being connected to one of the hydraulically-operated lift arms of the tractor. The cable 28 is of round section so as to be capable of a change of direction as it passes about the two pulley wheels 29. It will be apparent that if the lift arm is operated so as to pull the cable 28 upwardly the upper end of the column 16 will be drawn in towards the side of the tractor, and if the lift arm is lowered the column 16 will be permitted to swing outwardly away from the side of the tractor.

Fastened to the sleeve 25, near the upper end thereof, is a bearing sleeve 34 having a short longitudinal shaft 35 journalled in it. The rear end of the shaft 35 has a pulley wheel 36 fastened to it, that pulley wheel 36 being, in normal usage, substantially in alignment with the pulley wheel 21 on the shaft 19, and the pulley wheel 36 is operatively connected to the pulley wheel 21 by a round-section belt 37.

The front end of the shaft 35 is journalled in bearings mounted in the driving head 38 of a reciprocatory cutter bar 39 of known type. As illustrated in FIG. 1 the cutter bar has two cutter blades which are mounted for opposed reciprocatory motion. It is apparent that the driving head 38 can turn on the shaft 35, so that the angular position of the cutter bar 39 relative to the column 16 may be adjusted. To provide for adjustment of that angular relationship, and the securing of the cutter bar 39 in the adjusted angular position, a screw-threaded rod 40 is connected at one end to a lug 41 secured to the sleeve 25. Said rod 40 is fitted through a lug 42 on the driving head 38 and the angular position of the cutter bar 39 may be adjusted by adjusted nuts 43 on said rod 40.

Also mounted slidably on the column 16 are two clamp blocks 45 and 46 supporting jockey pulley wheels 47 and 48, respectively. These blocks 45, 46 and the jockey pulley wheels 47, 48 carried thereby may be used to provide a suitable tension in the belt 37—for that purpose the blocks 45, 46 may be turned on the column 16 so that the shafts supporting the jockey pulley wheels 47, 48 are not parallel to the shafts 19 and 35 and the belt 37 engaged with the several pulley wheels so as to travel in a criss-cross fashion, the angular setting of the blocks 45, 46 being effective to prevent rubbing of the belt 37 where it crosses itself.

In operation, the sleeve 25 is set at the correct position in the column 16, according to the work to be preformed by the cutter bar 39, the clamp blocks 45 and 46 are moved to appropriate positions for their jockey pulley wheels 47, 48 to engage the belt 37 and apply a suitable tension thereto. Then the tractor contacts are operated to move the lift arms so that the angular position of the column 16 is set as required, and the cutter bar 39 is moved to the required angular setting and the nuts 43 tightened to hold it in that position.

Several different positions of the cutter bar 39 and column 16 are shown in FIGS. 2, 3 and 4. As shown in FIG. 2, and by dotted lines in FIG. 3, the cutter bar is set for cutting along the bottom of vines to clear the foliage away from the stems of the vines; when set as shown by the full lines in FIG. 3 the cutter bar may be used to clear the vertical face of the vines; and as shown in FIG. 4 the cutter bar may be used to trim the tops of the vines. When it is desired to cut close to the ground the sleeve may be slid down the column 16 and/or the angularity of the column 16 to the vertical may be increased so that the lower end of the cutter bar 39 is brought sufficiently close to the ground. For cutting the tops of tall vines the sleeve 25 is moved to the top of the column 16 and the column moved to a position such that the cutter bar 39 will cut at the desired height and angle.

The modified construction shown in FIG. 5 incorporates a pivotally movable column 16, as described above, with a driving head 38 pivotally mounted at or near the upper end thereof. In this construction there is provided a hydraulic drive unit 51 mounted on the driving head 38 so as to be adapted to drive the cutters carried by the cutter bar. The hydraulic drive unit 51 is connected to the hydraulic power unit of the tractor by flexible hydraulic pipelines 52 so that, by operating the hydraulic controls of the tractor, the hydraulic drive unit 51 may be operated to drive the cutters.

What I claim is:

1. Apparatus for cutting vines and other vegetation comprising a column, bracket means connected pivotally to one end of the column, said bracket means being adapted to be mounted on a tractor in such manner as to support the column in upwardly-extending position and pivotal relative to the tractor, a cutter bar, a driving head at one end of the cutter bar, cutter blades supported by the cutter bar, support means at the upper end of the column supporting the driving head and cutter bar in adjustable angular relationship with the column, said support means comprising a sleeve linearly slidable on the column, means for clamping said support sleeve in set position on the column, a bearing on the sleeve and a horizontal shaft journalled in the bearing, said shaft being mounted in a bearing in said driving head, means for adjusting the angular position of the cutter bar relative to the column and for securing them in adjusted angular relationship and transmitting a drive to said cutter blades.

2. Apparatus for cutting vines and other vegetation according to claim 1 wherein the power transmission means comprise a bearing mounted in said bracket means, a second bracket adapted to be mounted on the tractor, a second bearing carried by said second bracket, a driving shaft journalled in said bearing, a pulley wheel fastened to said driving shaft, a second pulley wheel fastened to said horizontal shaft, a drive belt operatively connecting said pulley wheels, and two jockey pulley wheels mounted on two clamp blocks adapted to be moved slidably, independently on said column and to be fastened in set positions thereon, said jockey pulley wheels being adapted to be engaged by said drive belt and to take up slack therein.

3. Apparatus for cutting vines and other vegetation according to claim 1 in which a hydraulic motor driven from the hydraulic drive mechanism of a tractor transmits a drive to said cutter blades.

4. Apparatus for cutting vines and other vegetation comprising a tractor, bracket means mounted on one side of the tractor, a column mounted pivotally at its lower end on the bracket and extending upwardly therefrom, a cutter bar, a drive head at one end of the cutter bar, means connecting the drive head pivotally to the upper end portion of the column, the cutter bar being movable pivotally from a position close to and substantially parallel to the column to a position extending outwardly from the column and substantially horizontal when the column is in an upright position, means for adjusting the angular position of the cutter bar and for holding it in adjusted position relative to the column, cutter blades mounted in reciprocatory manner on the cutter bar, means for moving the column angularly relative to the tractor, a sleeve mounted slidably on the upper end portion of the column, said sleeve having means for clamping it in fixed position on said column, a bearing fastened to said sleeve so that its axis is substantially horizontal, and a driven shaft journalled in said sleeve and connected to said drive head so as to support the drive head, cutter bar and cutter blades and to be adapted to impart a drive to the cutter blades from the power take-off of the tractor.

5. Apparatus for cutting vines and other vegetation according to claim 4 wherein the means for moving the column angularly comprises a cable connected to the upper end portion of said column and to the hydraulically-operable lift arms of the tractor, and guide means for the cable fastened on the side of the tractor opposite said first side, the part being so arranged that by operation of said lift arms the column will be caused to swing outwardly or inwardly of the tractor.

6. Apparatus for cutting vines and other vegetation according to claim 4 wherein the means for transmitting a drive to the cutter blades include a drive shaft journalled in the drive head, a first pulley wheel fastened to said drive shaft, a bearing mounted on said bracket means, a power transmission shaft journalled in said bearing, a second pulley wheel fastened to said power transmission shaft, two blocks linearly movable on said column and adapted to be secured in set position thereon, a jocket pulley wheel mounted rotatably on each of said blocks, and a drive belt engaged with said first and second pulley wheels and engageable with said jockey pulley wheels.

References Cited

UNITED STATES PATENTS 1,453,621  5/1923  Conrade _____ 56—233

FOREIGN PATENTS 699,825  11/1953  Great Britain.
961,137  6/1964  Great Britain.

LUCIE H. LAUDENSLAGER, *Primary Examiner.*

U.S. Cl. X.R.

56—233